United States Patent [19]

Cho

[11] Patent Number: 5,635,910
[45] Date of Patent: Jun. 3, 1997

[54] FLUID RECOVERY DEVICE FOR USE IN A NUMERICALLY CONTROLLED LATHE

[75] Inventor: Min H. Cho, Kyungsangnam-Do, Rep. of Korea

[73] Assignee: Daewoo Heavy Industries Ltd., Incheon, Rep. of Korea

[21] Appl. No.: 360,877

[22] Filed: Dec. 21, 1994

[30] Foreign Application Priority Data

Dec. 22, 1993 [KR] Rep. of Korea ............ 93-28938 U.M.

[51] Int. Cl.$^6$ .................................................. G08B 21/00
[52] U.S. Cl. ........................... 340/605; 340/616; 340/618; 82/900; 82/901
[58] Field of Search .................................. 340/605, 603, 340/612, 616, 618, 623, 624, 625; 82/900, 901, 122

[56] References Cited

U.S. PATENT DOCUMENTS

| | | | |
|---|---|---|---|
| 3,399,399 | 8/1968 | Apfelbaum | 340/620 |
| 5,494,134 | 2/1996 | McConkey | 82/900 |

*Primary Examiner*—Jeffery Hofsass
*Assistant Examiner*—Julie B. Lieu
*Attorney, Agent, or Firm*—Lowe, Price, LeBlanc & Becker

[57] ABSTRACT

A numerically controlled lathe includes a spindle, a hydraulic rotary cylinder driven by a pressurized working fluid for causing the spindle to rotate, a fluid pump for discharging the working fluid to be delivered to the hydraulic rotary cylinder, a reservoir for storage of the working fluid, first and second delivery conduits each having first and second ends, the first ends of the delivery conduits selectively connected to the fluid pump and the reservoir, and a fluid coupler for coupling the second ends of the delivery conduits with the hydraulic rotary cylinder. The fluid recovery device comprises a drain tank communicating with the fluid coupler via a first recovery pipe to collect a leak fluid discharged from the fluid coupler; a recovery pump for forcing the collected leak fluid toward the reservoir via a second recovery pipe; a fluid level detector mounted within the drain tank for detecting level of the leak fluid collected in the drain tank to issue an electric signal triggering operation of the recovery pump as the leak fluid level reaches a first elevation; and an electric motor for rotatably driving the recovery pump in response to the electric signal fed from the fluid level detector.

2 Claims, 2 Drawing Sheets

FLUID RECOVERY DEVICE FOR USE IN A NUMERICALLY CONTROLLED LATHE

FIELD OF THE INVENTION

The present invention pertains generally to a numerically controlled lathe, and more particularly to a fluid recovery device for use in the numerically controlled lathe which has the ability to effectively return a working fluid leaked at the interface of delivery conduits and a hydraulic rotary cylinder, back to a pressure supply source.

DESCRIPTION OF THE PRIOR ART

Most of the numerically controlled vertical lathes include, among other things, a spindle mounted vertically on a bed for rotational movement with respect thereto and a chuck carried by the spindle for holding a workpiece to be cut. The spindle and the chuck may be driven by a working fluid under pressure which is fed from a fluid pump. Typically, a hydraulic rotary cylinder or motor that can convert the fluid pressure into a rotary force is used to rotatably drive the spindle. The rotary cylinder is in a fluid communication with the fluid pump by way of a pair of delivery conduits, one for feeding the working fluid to a first inlet port of the rotary cylinder to cause forward rotation of the spindle and the other for supplying the working fluid to a second inlet port of the rotary cylinder to cause reverse rotation of the spindle.

What is often referred to as a "rotating fluid coupler" has heretofore been employed to connect the delivery conduits to the inlet ports of the rotary cylinder. With the rotating fluid coupler used in the art, the delivery conduits are provided with a common fluid connector at their outlet ends, which remains stationary with respect to the rotary cylinder. Mainly because the rotary cylinder is kept in a rotating contact with the fluid connector, unavoidable leakage of the working fluid tends to occur at the interface of the fluid connector and the rotary cylinder.

To recover the leak fluid for the sake of its recirculation, the state-of-the-art lathes are customarily designed to simply interconnect a leak fluid drain port of the fluid connector and a fluid reservoir by means of a recovery pipe, thus permitting the leak fluid to "naturally" flow into the reservoir via the recovery pipe. The recovery pipe extends downwardly from the fluid connector and then goes upwards toward the reservoir. Such a natural recovery system is, therefore, disadvantageous in that the leak fluid has a tendency to stay within the recovery pipe for an unduly long period of time. The result is that the stagnant leak fluid may be heated to an unacceptable temperature by the thermal energy radiated from the rotary cylinder. It goes without saying that the leak fluid of elevated temperature should adversely affect various components of the lathe, sometimes leading to a premature failure or a reduced accuracy of the hydraulically operated components.

SUMMARY OF THE INVENTION

Accordingly, it is an object of the invention to provide a fluid recovery device for use in a numerically controlled lathe that can collect a leak fluid at an isolated location as quickly as the fluid leakage takes place and then forcedly return the collected leak fluid back to a fluid reservoir in a controlled manner so as to avoid overheating the leak fluid which would otherwise results in a thermal damage of component parts of the lathe.

With this object in view, the present invention provides a fluid recovery device for use in a numerically controlled lathe, the lathe including a spindle, a hydraulic rotary cylinder driven by a pressurized working fluid for causing the spindle to rotate, a fluid pump for discharging the working fluid to be delivered to the hydraulic rotary cylinder, a reservoir for storage of the working fluid, first and second delivery conduits each having first and second ends, the first ends of the delivery conduits selectively connected to the fluid pump and the reservoir, and a fluid coupler for coupling the second ends of the delivery conduits with the hydraulic rotary cylinder, the fluid recovery device comprising: a drain tank communicating with the fluid coupler via a first recovery pipe to collect a leak fluid discharged from the fluid coupler; a recovery pump for forcing the collected leak fluid toward the reservoir via a second recovery pipe; a fluid level detector mounted within the drain tank for detecting level of the leak fluid collected in the drain tank to issue an electric signal triggering operation of the recovery pump as the leak fluid level reaches a first preselected elevation; and an electric motor for rotatably driving the recovery pump in response to the electric signal fed from the fluid level detector.

BRIEF DESCRIPTION OF THE DRAWINGS

Other objects, features and advantages of the invention will become apparent from a review of the following description of the preferred embodiment taken in conjunction with the accompanying drawing in which.

DETAILED DESCRIPTION OF THE PREFERRED EMBODIMENT

Figure 1:
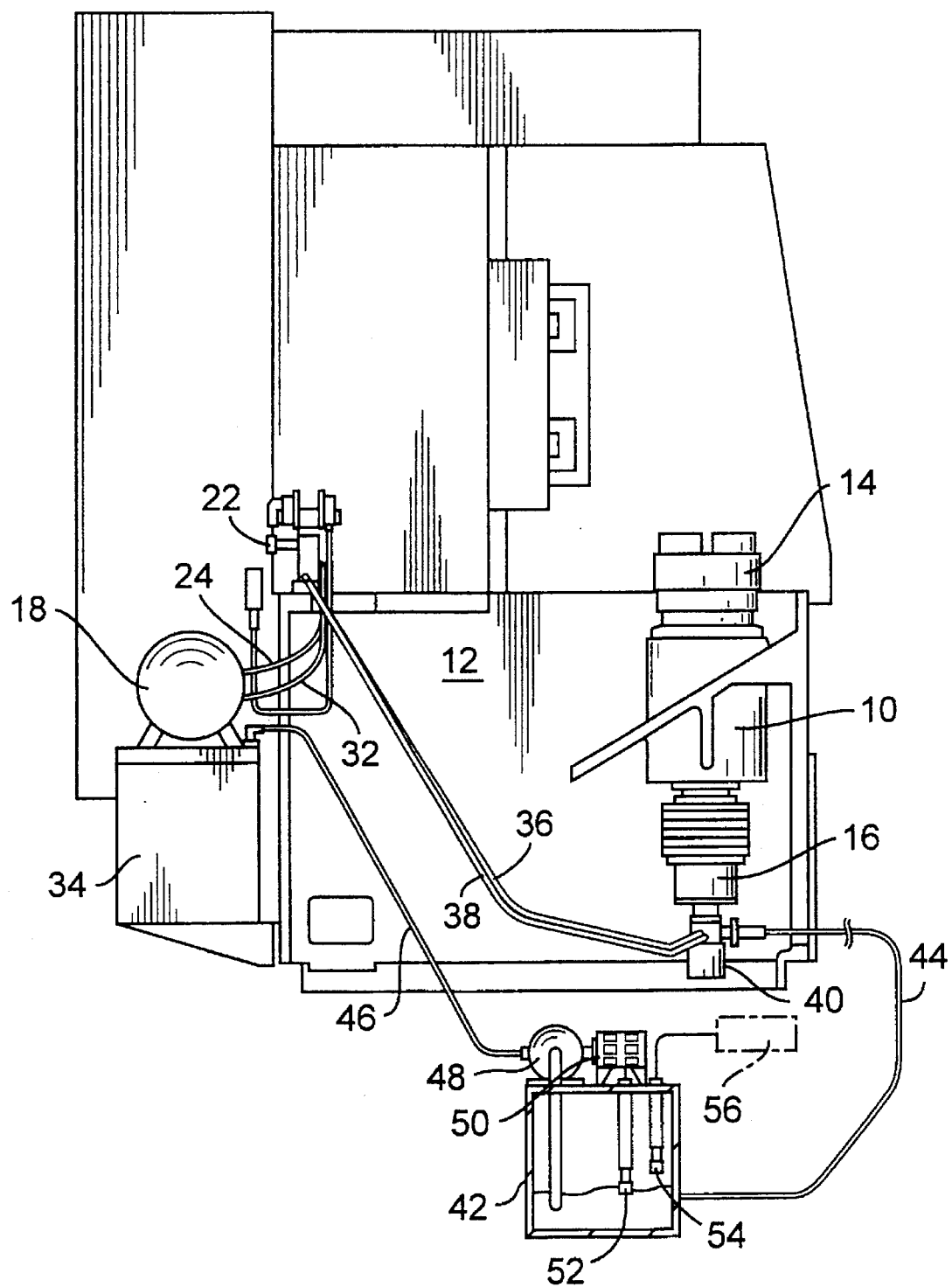
FIG. 1 is a schematic side elevational view showing a numerically controlled vertical lathe which employs the fluid recovery device in accordance with the present invention.

Referring now to FIG. 1, there is schematically shown a numerically controlled vertical lathe that makes use of the fluid recovery device in accordance with the invention. The lathe includes a spindle 10 rotatably mounted on a bed 12 for rotational movement with respect thereto and a hydraulic chuck 14 carried by the spindle 10 for holding a workpiece to be cut. Immediately below the spindle 10, a hydraulic rotary cylinder 16 is positioned in an end-to-end relationship to cause rotation of the spindle 10. The hydraulic rotary cylinder 16 is designed to be rotatably driven by a pressurized working fluid in a forward or a reverse direction.

Figure 2:
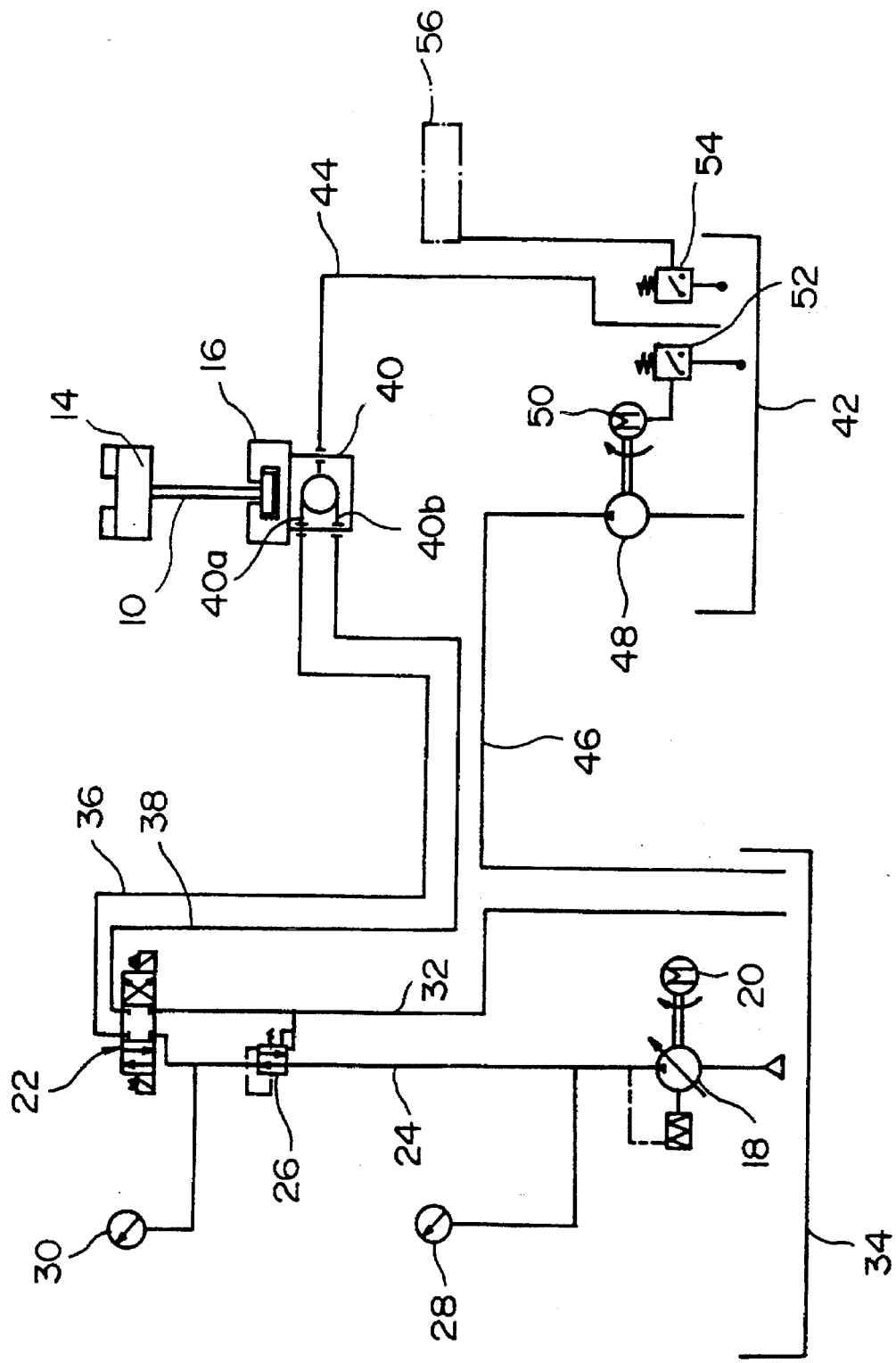
FIG. 2 is a hydraulic circuit diagram of the numerically controlled vertical lathe illustrated in FIG. 1.

As is apparent from FIG. 2, the pressurized working fluid is discharged by a variable displacement pump 18 which in turn receives rotational force from a prime mover, e.g., electric motor 20. The working fluid is then supplied to a flow control valve 22 via a discharge pipe 24 and a pressure reducing valve 26 disposed somewhere along the discharge pipe 24. The pressure reducing valve 26 assists in restricting the pressure of the working fluid to a level acceptable to the hydraulic rotary cylinder 16. Pressure indicators 28 and 30 are connected to the discharge pipe 24 so as to allow the lathe operator to monitor the fluid pressures developed at upstream and downstream of the pressure reducing valve 26.

Extending in parallel to the discharge pipe 24 is a drain pipe 32 which enables the flow control valve 22 to communicate with a fluid reservoir 34. First and second delivery conduits 36 and 38 are used to bring the flow control valve 22 into a fluid communication with the hydraulic rotary cylinder 16. Each of the first and second delivery conduits 36 and 38 has a first end which may be selectively connected to the discharge pipe 24 or the drain pipe 32 depending on the position of the flow control valve 22 and a second end which is coupled to the hydraulic rotary cylinder 16 by way of a fluid coupler 40.

As best shown in FIG. 2, the flow control valve 22 may be shifted to a first operative position and a second operative position from a neutral position depicted in FIG. 2 to thereby change over the flow path of the working fluid. When the flow control valve 22 is moved from the neutral position to the first operative position, i.e., rightmost position in FIG. 2, the discharge pipe 24 comes into connection with the first delivery conduit 36 so that the working fluid created by from the variable displacement pump 18 can be fed via the first delivery conduit 36 to a first port 40a of the fluid coupler 40 to make the hydraulic rotary cylinder 16 rotate in the forward direction. At this moment, the working fluid used in the hydraulic rotary cylinder 16 is discharged through a second port 40b of the fluid coupler 40 and then returns back to the reservoir 34 via the second conduit 38 and the drain pipe 32. In contrast, if the flow control valve 22 is moved to the second operative position, i.e., the leftmost position in FIG. 2, the pressurized working fluid is fed to the second port 40b via the second supply conduit 38 to cause rotation of the hydraulic rotary cylinder 16 in the reverse direction. The used working fluid is returned back to the reservoir 34 via the first delivery conduit 36 and the drain pipe 32 in the named sequence.

For the very reason that the fluid coupler 40 is adapted to provide a "rotating fluid coupling" at the interface of the first and second delivery conduits 38 and 36 and the hydraulic rotary cylinder 16, the working fluid is constrained to leak at least partially from the fluid coupler 40. In the illustrated embodiment, the leak fluid is first collected in a drain tank 42 which lies far beneath of the fluid coupler 40 to facilitate flowing down of the leak fluid into the drain tank 42 through a first recovery pipe 44. The leak fluid gathered in the drain tank 42 is forcedly returned to the reservoir 34 via a second recovery pipe 46. To render the forced returning of the leak fluid effective, a recovery pump 48 is employed whose inlet port extends into the drain tank 42 and whose outlet port is connected to the second recovery pipe 46. The recovery pump 48 may be rotatably driven by means of, e.g., an electric motor 50, the energization of which depends on the level of the leak fluid collected in the drain tank 42.

A fluid level detector 52 is mounted within the drain tank 42 to detect the leak fluid level. The fluid level detector 52 is adapted to issue an electric signal triggering operation of the electric motor 50 and hence the recovery pump 48 as the leak fluid level reaches a first preselected elevation. Conversely, so long as the leak fluid level fails to reach the first elevation, the electric motor 50 remains at rest because no electric triggering signal would be issued from the fluid level detector 52. Mounted within the drain tank in a juxtaposed relationship with the fluid level detector 52 is a failsafe detector 54 that serves to feed an emergency signal to a lathe controller 56, if the leak fluid level reaches a second preselected elevation higher than the first elevation, to cease any further operation of the lathe. It should be appreciated that the failsafe detector 54 lies at a higher position than the fluid level detector 52. This assures that the recovery pump 48 should continue to operate during the time period when the leak fluid level is maintained above the first elevation but below the second one.

While the invention has been described with reference to a preferred embodiment, it should be apparent to those skilled in the art that many changes and modifications may be made without departing from the spirit and scope of the invention as defined in the claims.

What is claimed is:

1. A fluid recovery device for use in a numerically controlled vertical lathe, the lathe including a spindle, a hydraulic rotary cylinder driven by a pressurized working fluid for causing the spindle to rotate, a fluid pump for discharging the working fluid to be delivered to the hydraulic rotary cylinder, a reservoir for storage of the working fluid, first and second delivery conduits each having first and second ends, the first ends of the delivery conduits selectively connected to the fluid pump and the reservoir, a fluid coupler for coupling the second ends of the delivery conduits with the hydraulic rotary cylinder, and a controller for controlling operation of the lathe, the fluid recovery device comprising:

a drain tank provided below and communicating with the fluid coupler via a first recovery pipe to collect a leak fluid discharged from the fluid coupler;

a recovery pump mounted outside the drain tank for forcing the collected leak fluid toward the reservoir via a second recovery pipe for reuse;

a fluid level detector mounted within the drain tank for detecting level of the leak fluid collected in the drain tank to issue an electric signal triggering operation of the recovery pump as the leak fluid level reaches a first preselected elevation;

a failsafe detector mounted within the drain tank for producing an emergency signal in the event that the leak fluid level reaches a second preselected elevation higher than the first elevation, to enable the controller to cease operation of the lathe; and an electric motor for rotatably driving the recovery pump in response to the electric signal fed from the fluid level detector.

2. The fluid recovery device as recited in claim 1, wherein the failsafe detector is mounted at a higher position than the fluid level detector so that the recovery pump continues to operate when the leak fluid level remains above the first elevation and below the second elevation.

* * * * *